United States Patent
Van Phan et al.

(10) Patent No.: US 11,638,200 B2
(45) Date of Patent: Apr. 25, 2023

(54) METHOD, APPARATUS, SYSTEM AND COMPUTER PROGRAM FOR VEHICULAR COMMUNICATION SMART RADIO ACCESS ZONES

(71) Applicant: Nokia Solutions and Networks Oy, Espoo (FI)

(72) Inventors: Vinh Van Phan, Oulu (FI); Ling Yu, Kauniainen (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/556,278

(22) PCT Filed: Mar. 11, 2015

(86) PCT No.: PCT/EP2015/055030
§ 371 (c)(1),
(2) Date: Sep. 6, 2017

(87) PCT Pub. No.: WO2016/141980
PCT Pub. Date: Sep. 15, 2016

(65) Prior Publication Data
US 2018/0049104 A1    Feb. 15, 2018

(51) Int. Cl.
*H04W 48/08* (2009.01)
*H04W 76/14* (2018.01)
(Continued)

(52) U.S. Cl.
CPC ........... *H04W 48/08* (2013.01); *H04W 76/14* (2018.02); *H04W 84/10* (2013.01);
(Continued)

(58) Field of Classification Search
CPC ..... H04W 48/08; H04W 76/14; H04W 84/10; H04W 16/32; H04W 84/02; B60W 2556/45
See application file for complete search history.

(56) References Cited

U.S. PATENT DOCUMENTS

| | | | | |
|---|---|---|---|---|
| 2007/0072637 A1* | 3/2007 | Inoue | ..................... | H04W 4/08 455/518 |
| 2014/0302774 A1* | 10/2014 | Burke | ..................... | H04W 4/08 455/3.05 |
| 2015/0195827 A1* | 7/2015 | Feng | ................... | H04L 63/0428 380/270 |

FOREIGN PATENT DOCUMENTS

| | | |
|---|---|---|
| CN | 104052802 A | 9/2014 |
| WO | 2013/113371 A1 | 8/2013 |

(Continued)

OTHER PUBLICATIONS

Harding et al., "Vehicle-to-Vehicle Communications: Readiness of V2V Technology for Application", National Highway Traffic Safety Administration, DOT HS 812 014, Aug. 2014, 327 pages.

(Continued)

*Primary Examiner* — Mandish K Randhawa
(74) *Attorney, Agent, or Firm* — Brake Hughes Bellermann LLP

(57) ABSTRACT

There is provided a method comprising determining a service coverage zone operation within a network, the network able to form a synchronised sub-network, and being associated with at least one cellular network which provides cellular access over the coverage area of the network, configuring, in dependence on the determined service coverage zone operation, a plurality of nodes of the network for providing a service coverage zone to provide at least one service, providing an indication of the service coverage zone (Continued)

```
┌─────────────────────────────────────────────┐
│ Determining a service coverage zone         │
│ operation within a network, the network     │
│ able to form a synchronised sub-network,    │
│ and being associated with at least one      │
│ cellular network which provides cellular    │
│ access over the coverage area of the        │
│ network                                     │
└─────────────────────────────────────────────┘
                     │
┌─────────────────────────────────────────────┐
│ Configuring, in dependence on the determined│
│ service coverage zone operation, a plurality│
│ of nodes of the network for providing a     │
│ service coverage zone to provide at least   │
│ one service                                 │
└─────────────────────────────────────────────┘
                     │
┌─────────────────────────────────────────────┐
│ Providing an indication of the service      │
│ coverage zone to at least one user equipment│
└─────────────────────────────────────────────┘
                     │
┌─────────────────────────────────────────────┐
│ Controlling access of the at least one user │
│ equipment to the at least one service       │
└─────────────────────────────────────────────┘
``` to at least one user equipment and controlling access of the at least one user equipment to the at least one service.

22 Claims, 10 Drawing Sheets

(51) Int. Cl.
  *H04W 84/10* (2009.01)
  *H04W 84/02* (2009.01)
  *H04W 16/32* (2009.01)

(52) U.S. Cl.
  CPC ......... *B60W 2556/45* (2020.02); *H04W 16/32* (2013.01); *H04W 84/02* (2013.01)

(56) References Cited

FOREIGN PATENT DOCUMENTS

| WO | 2014/012244 A1 | 1/2014 |
| WO | 2014012244 A1 | 1/2014 |
| WO | 2014173429 A1 | 10/2014 |
| WO | 2014198325 A1 | 12/2014 |
| WO | 2016/029932 A1 | 3/2016 |

OTHER PUBLICATIONS

"Scenarios, Requirements and KPIs For 5G Mobile and Wireless-System", Mobile and wireless communications Enablers for the Twenty-twenty Information Society (METIS), ICT-317669-METIS/D1.1, Apr. 2013, 84 pages.

"Vehicular Communication Systems", Wikipedia, Retrieved on Aug. 23, 2017, Webpage available at : https://en.wikipedia.org/wiki/Vehicular_communication_systems.

Hartenstein et al., "A Tutorial Survey On Vehicular Ad Hoc Networks", IEEE Communications Magazine, vol. 46, No. 6, Jun. 2008, pp. 164-171.

Chen et al., "Automotive Networking And Applications", IEEE Communications Magazine, vol. 52, No. 6, Jun. 2014, pp. 160-162.

Dressler et al., "Inter-Vehicle Communication: Quo vadis", IEEE Communications Magazine, vol. 52, No. 6, Jun. 2014, pp. 170-177.

International Search Report and Written Opinion received for corresponding Patent Cooperation Treaty Application No. PCT/EP2015/055030, dated Dec. 8, 2015, 15 pages.

"V2P Use Case for Road Safety Services", 3GPP TSG-SA WG1 Meeting #69, S1-150060, LG Electronics Inc., Feb. 2-6, 2015, 3 pages.

"3rd Generation Partnership Project; Technical Specification Group Services and System Aspects; Study on LTE Support for V2X Services (Release 14)", 3GPP TR 22.7de, V0.1.0, Feb. 2015, pp. 1-18.

Li et al., "Overview On Initial METIS D2D Concept", 1st International Conference on 5G for Ubiquitous Connectivity (5GU), Nov. 26-28, 2014, pp. 203-208.

Office Action received for corresponding European Patent Application No. 15709667.8, dated Aug. 7, 2018, 8 pages.

Office Action received for corresponding European Patent Application No. 15709667.8, dated Dec. 20, 2018, 6 pages.

Office Action for Chinese Application No. 201580077569.0, dated Aug. 26, 2020, 7 pages.

\* cited by examiner

Figure 5b

Receiving an indication of a service coverage zone service within a network, the service coverage zone service provided by a plurality of nodes of the network being configured in dependence on a determined service coverage zone operation, the network comprising a plurality of nodes being able to form a synchronised sub-network, and being associated with at least one cellular network which provides cellular access over the coverage area of the network Requesting access to the at least one service

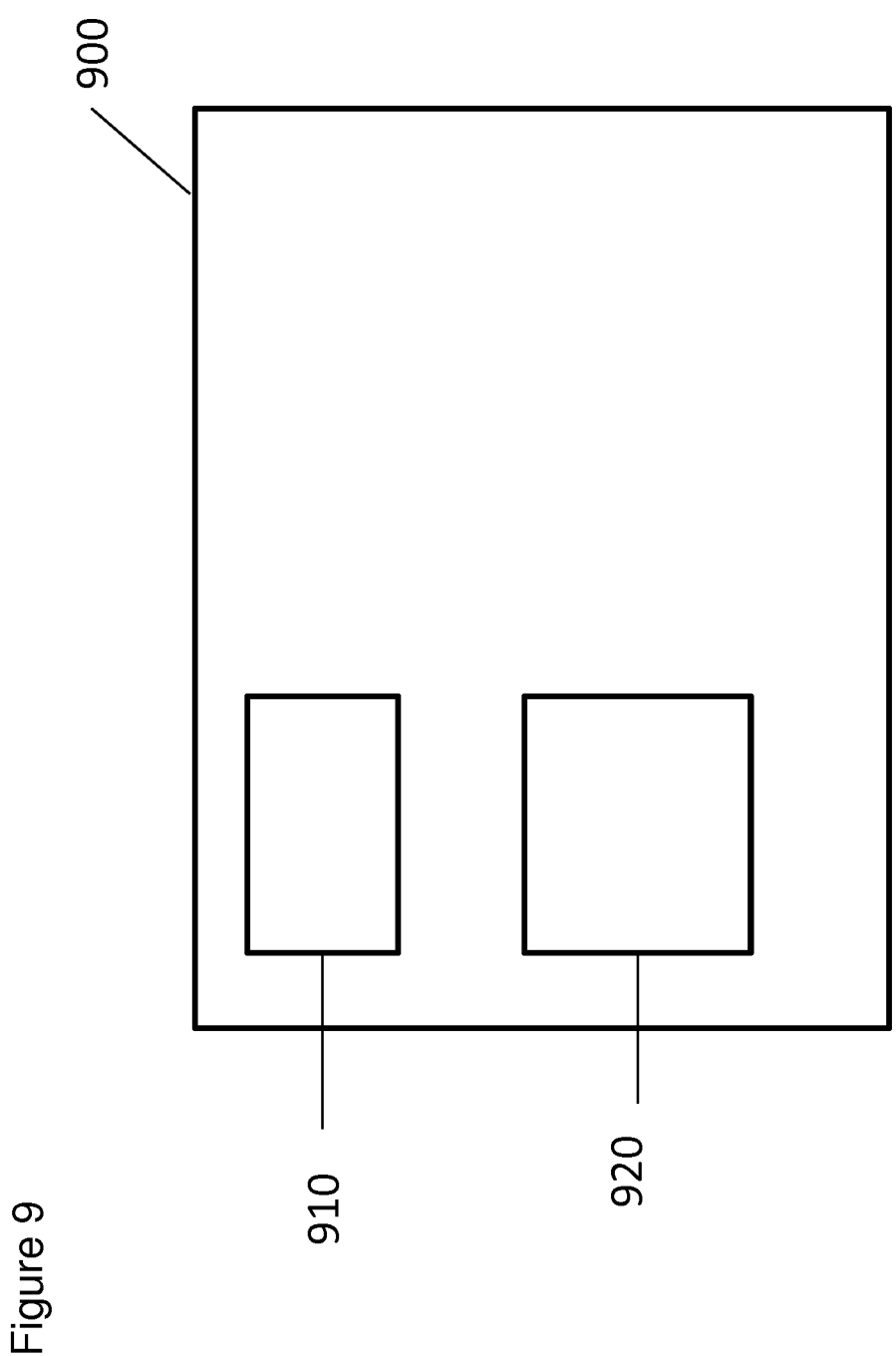

METHOD, APPARATUS, SYSTEM AND COMPUTER PROGRAM FOR VEHICULAR COMMUNICATION SMART RADIO ACCESS ZONES

RELATED APPLICATION

This application was originally filed as Patent Cooperation Treaty Application No. PCT/EP2015/055030 filed Mar. 11, 2015.

FIELD

The present application relates to a method, apparatus, system and computer program and in particular but not exclusively, to smart radio access zones for vehicle-to-X (V2X) communications in 5G, where X may be, amongst others vehicle (V), infrastructure (I) and pedestrian (P).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

SUMMARY OF THE INVENTION

In a first aspect there is provided a method comprising determining a service coverage zone operation within a network, the network able to form a synchronised sub-network, and being associated with at least one cellular network which provides cellular access over the coverage area of the network, configuring, in dependence on the determined service coverage zone operation, a plurality of nodes of the network for providing a service coverage zone to provide at least one service, providing an indication of the service coverage zone to at least one user equipment and controlling access of the at least one user equipment to the service.

The indication of the service coverage zone may comprise service coverage zone identity information.

The indication of the service coverage zone may be provided by at least one of a node of the network and a node of the associated cellular network.

The plurality of nodes may be configured to provide a user equipment with at least one of instant radio access and cellular access.

The method may comprise receiving a service request associated with the at least one service from the at least one user equipment, performing, in response to the service request, a service configuration for the at least one user device and providing service configuration information to the at least one user equipment.

The service request may comprise service coverage zone identity information.

The method may comprise providing user equipment information to the plurality of nodes.

Performing service configuration may comprise determining at least one of authentication, authorization, admission control and resource allocation for the at least one user equipment.

Performing service configuration may comprise determining a mode of operation, the mode of operation comprising at least one of device type communications mode or cellular access mode.

Device type communications may comprise at least one of instant radio access and device to device communications between a plurality of nodes and user equipments.

Instant radio access may comprise one to many broadcast based device to device communication.

The method may comprise receiving a release request from the at least one user equipment, providing release confirmation to the at least one user equipment and providing release information to the plurality of nodes.

The service coverage zone operation may include at least one of creating, modifying and releasing a service coverage zone.

The method may comprise determining the service coverage zone operation in response to at least one of a request of the at least one user equipment, detection of a transmission from the at least one user equipment and a decision to provide the at least one service.

The node configuration may comprise at least one of service coverage zone identity, service coverage zone resource allocation and service coverage zone type.

A service may be shared by one or more operators.

In a second aspect there is provided a method comprising receiving an indication of a service coverage zone within a network, the service coverage zone providing at least one service, and provided by a plurality of nodes of the network configured in dependence on a determined service coverage zone operation, the network being able to form a synchronised sub-network, and being associated with at least one cellular network which provides cellular access over the coverage area of the network and requesting user equipment access to the at least one service.

The indication of the service coverage zone may comprise service coverage zone identity information. The indication of the service coverage zone may be provided by at least one of a node of the network and a node of the associated cellular network.

The plurality of nodes may be configured to provide a user equipment with at least one of instant radio access and cellular access.

The method may comprise causing a service request associated with the at least one service to be sent to a node and receiving service configuration information, said service configuration performed in response to the service request.

The service request may comprise service coverage zone identity information.

Performing service configuration may comprise determining at least one of authentication, authorization, admission control and resource allocation for the at least one user equipment.

Performing service configuration may comprise determining a mode of operation, the mode of operation comprising at least one of device type communications mode or cellular access mode.

Device type communications may comprise at least one of instant radio access and device to device communications between a plurality of nodes and user equipments.

Instant radio access may comprise one to many broadcast based device to device communication.

The method may comprise causing a release request to be sent to a node and receiving release confirmation from the node.

The node may be at least one of a node of the network and a node of the associated cellular network.

The service coverage zone operation may include at least one of creating, modifying and releasing a service coverage zone.

The method may comprise at least one of causing a request to be sent from the at least one user equipment and a transmission to be sent from the at least one user equipment, the service coverage zone operation determined in response to the request and transmission, respectively.

Node configuration may comprise at least one of service coverage zone identity, service coverage zone resource allocation and service coverage zone type.

A service may be shared by one or more operators.

In a third aspect there is provided an apparatus, said apparatus comprising means for determining a service coverage zone operation within a network, the network able to form a synchronised sub-network, and being associated with at least one cellular network which provides cellular access over the coverage area of the network, means for configuring, in dependence on the determined service coverage zone operation, a plurality of nodes of the network for providing a service coverage zone to provide at least one service, means for providing an indication of the service coverage zone to at least one user equipment and means for controlling access of the at least one user equipment to the service.

The indication of the service coverage zone may comprise service coverage zone identity information.

The indication of the service coverage zone may be provided by at least one of a node of the network and a node of the associated cellular network.

The plurality of nodes may be configured to provide a user equipment with at least one of instant radio access and cellular access.

The apparatus may comprise means for receiving a service request associated with the at least one service from the at least one user equipment, performing, in response to the service request, a service configuration for the at least one user device and providing service configuration information to the at least one user equipment.

The service request may comprise service coverage zone identity information.

The apparatus may comprise means for providing user equipment information to the plurality of nodes.

Means for performing service configuration may comprise means for determining at least one of authentication, authorization, admission control and resource allocation for the at least one user equipment.

Means for performing service configuration may comprise means for determining a mode of operation, the mode of operation comprising at least one of device type communications mode or cellular access mode.

Device type communications may comprise at least one of instant radio access and device to device communications between a plurality of nodes and user equipments.

Instant radio access may comprise one to many broadcast based device to device communication.

The apparatus may comprise means for receiving a release request from the at least one user equipment, providing release confirmation to the at least one user equipment and means for providing release information to the plurality of nodes.

The service coverage zone operation may include at least one of creating, modifying and releasing a service coverage zone.

The node configuration may comprise at least one of service coverage zone identity, service coverage zone resource allocation and service coverage zone type.

The apparatus may comprise means for determining the service coverage zone operation in response to at least one of a request of the at least one user equipment, detection of a transmission from the at least one user equipment and a decision to provide the at least one service.

A service may be shared by one or more operators.

In a fourth aspect there is provided an apparatus, said apparatus comprising means for receiving an indication of a service coverage zone within a network, the service coverage zone providing at least one service, and provided by a plurality of nodes configured in dependence on a determined service coverage zone operation, the network being able to form a synchronised sub-network, and being associated with at least one cellular network which provides cellular access over the coverage area of the network and means for requesting access to the at least one service.

The indication of the service coverage zone may comprise service coverage zone identity information.

The indication of the service coverage zone may be provided by at least one of a node of the network and a node of the associated cellular network.

The plurality of nodes may be configured to provide a user equipment with at least one of instant radio access and cellular access.

The apparatus may comprise means for causing a service request associated with the at least one service to be sent and receiving service configuration information, said service configuration performed in response to the service request.

The service request may comprise service coverage zone identity information.

Means for performing service configuration may comprise means for determining at least one of authentication, authorization, admission control and resource allocation for the at least one user equipment.

Means for performing service configuration may comprise means for determining a mode of operation, the mode of operation comprising at least one of device type communications mode or cellular access mode.

Device type communications may comprise at least one of instant radio access and device to device communications between a plurality of nodes and user equipments.

Instant radio access may comprise one to many broadcast based device to device communication.

The apparatus may comprise means for causing a release request to be sent to a node and receiving release confirmation from the node.

The node may be at least one of a node of the network and a node of the associated cellular network.

The service coverage zone operation may include at least one of creating, modifying and releasing a service coverage zone.

The apparatus may comprise means for causing at least one of a request and a transmission to be sent from the at least one user equipment, the service coverage zone operation determined in response to the request and transmission, respectively.

Node configuration may comprise at least one of service coverage zone identity, service coverage zone resource allocation and service coverage zone type.

A service coverage zone may be shared by one or more operators.

In a fifth aspect there is provided an apparatus comprising at least one processor and at least one memory including a computer program code, the at least one memory and the computer program code configured to, with the at least one processor, cause the apparatus at least to: determine a service coverage zone operation within a network, the network able to form a synchronised sub-network, and being associated with at least one cellular network which provides cellular access over the coverage area of the network, configure, in dependence on the determined service coverage zone operation, a plurality of nodes of the network for providing a service coverage zone to provide at least one service, provide an indication of the service coverage zone to at least one user equipment and control access of the at least one user equipment to the service.

The indication of the service coverage zone may comprise service coverage zone identity information.

The indication of the service coverage zone may be provided by at least one of a node of the network and a node of the associated cellular network.

The plurality of nodes may be configured to provide a user equipment with at least one of instant radio access and cellular access.

The apparatus may be configured to receive a service request associated with the at least one service from the at least one user equipment, perform, in response to the service request, a service configuration for the at least one user device and provide service configuration information to the at least one user equipment.

The service request may comprise service coverage zone identity information.

The apparatus may be configured to provide user equipment information to the plurality of nodes.

The apparatus may be configured to determine at least one of authentication, authorization, admission control and resource allocation for the at least one user equipment.

The apparatus may be configured to determine a mode of operation, the mode of operation comprising at least one of device type communications mode or cellular access mode.

Device type communications may comprise at least one of instant radio access and device to device communications between a plurality of nodes and user equipments.

Instant radio access may comprise one to many broadcast based device to device communication.

The apparatus may be configured to receive a release request from the at least one user equipment, providing release confirmation to the at least one user equipment and providing release information to the plurality of nodes.

The service coverage zone operation may include at least one of creating, modifying and releasing a service coverage zone.

The apparatus may be configured to determine the service coverage zone operation in response to at least one of a request of the at least one user equipment, detection of a transmission from the at least one user equipment and a decision to provide the at least one service.

The node configuration may comprise at least one of service coverage zone identity, service coverage zone resource allocation and service coverage zone type.

A service may be shared by one or more operators.

In a sixth aspect there is provided an apparatus comprising at least one processor and at least one memory including a computer program code, the at least one memory and the computer program code configured to, with the at least one processor, cause the apparatus at least to: receive an indication of a service coverage zone within a network, the service coverage zone providing at least one service, and provided by a plurality of nodes of the network configured in dependence on a determined service coverage zone operation, the network being able to form a synchronised sub-network, and being associated with at least one cellular network which provides cellular access over the coverage area of the network and request user equipment access to the at least one service.

The indication of the service coverage zone may comprise service coverage zone identity information.

The indication of the service coverage zone may be provided by at least one of a node of the network and a node of the associated cellular network.

The plurality of nodes may be configured to provide a user equipment with at least one of instant radio access and cellular access.

The apparatus may be configured to cause a service request associated with the at least one service to be sent to a node and receiving service configuration information, said service configuration performed in response to the service request.

The service request may comprise service coverage zone identity information.

The apparatus may be configured to determine at least one of authentication, authorization, admission control and resource allocation for the at least one user equipment.

The apparatus may be configured to determine a mode of operation, the mode of operation comprising at least one of device type communications mode or cellular access mode.

Device type communications may comprise at least one of instant radio access and device to device communications between a plurality of nodes and user equipments.

Instant radio access may comprise one to many broadcast based device to device communication.

The apparatus may be configured to cause a release request to be sent to a node and receiving release confirmation from the node.

The node may be at least one of a node of the network and a node of the associated cellular network.

The service coverage zone operation may include at least one of creating, modifying and releasing a service coverage zone.

The apparatus may be configured to cause, at least one of, a request to be sent from the at least one user equipment and a transmission to be sent from the at least one user equipment, the service coverage zone operation determined in response to the request and transmission, respectively.

Node configuration may comprise at least one of service coverage zone identity, service coverage zone resource allocation and service coverage zone type.

A service may be shared by one or more operators.

In a seventh aspect there is provided a computer program embodied on a non-transitory computer-readable storage medium, the computer program comprising program code for controlling a process to execute a process, the process comprising determining a service coverage zone operation within a network, the network able to form a synchronised sub-network, and being associated with at least one cellular network which provides cellular access over the coverage area of the network, configuring, in dependence on the determined service coverage zone operation, a plurality of nodes of the network for providing a service coverage zone to provide at least one service, providing an indication of the service coverage zone to at least one user equipment and controlling access of the at least one user equipment to the service.

The indication of the service coverage zone may comprise service coverage zone identity information.

The indication of the service coverage zone may be provided by at least one of a node of the network and a node of the associated cellular network.

The plurality of nodes may be configured to provide a user equipment with at least one of instant radio access and cellular access.

The process may comprise receiving a service request associated with the at least one service from the at least one user equipment, performing, in response to the service request, a service configuration for the at least one user device and providing service configuration information to the at least one user equipment.

The service request may comprise service coverage zone identity information.

The process may comprise providing user equipment information to the plurality of nodes.

Performing service configuration may comprise determining at least one of authentication, authorization, admission control and resource allocation for the at least one user equipment.

Performing service configuration may comprise determining a mode of operation, the mode of operation comprising at least one of device type communications mode or cellular access mode.

Device type communications may comprise at least one of instant radio access and device to device communications between a plurality of nodes and user equipments.

Instant radio access may comprise one to many broadcast based device to device communication.

The process may comprise receiving a release request from the at least one user equipment, providing release confirmation to the at least one user equipment and providing release information to the plurality of nodes.

The service coverage zone operation may include at least one of creating, modifying and releasing a service coverage zone.

The process may comprise determining the service coverage zone operation in response to at least one of a request of the at least one user equipment, detection of a transmission from the at least one user equipment and a decision to provide the at least one service.

The node configuration may comprise at least one of service coverage zone identity, service coverage zone resource allocation and service coverage zone type.

A service may be shared by one or more operators.

In an eighth aspect there is provided a computer program embodied on a non-transitory computer-readable storage medium, the computer program comprising program code for controlling a process to execute a process, the process comprising receiving an indication of a service coverage zone within a network, the service coverage zone providing at least one service, and provided by a plurality of nodes of the network configured in dependence on a determined service coverage zone operation, the network being able to form a synchronised sub-network, and being associated with at least one cellular network which provides cellular access over the coverage area of the network and requesting user equipment access to the at least one service.

The indication of the service coverage zone may comprise service coverage zone identity information. The indication of the service coverage zone may be provided by at least one of a node of the network and a node of the associated cellular network.

The plurality of nodes may be configured to provide a user equipment with at least one of instant radio access and cellular access.

The process may comprise causing a service request associated with the at least one service to be sent to a node and receiving service configuration information, said service configuration performed in response to the service request.

The service request may comprise service coverage zone identity information.

Performing service configuration may comprise determining at least one of authentication, authorization, admission control and resource allocation for the at least one user equipment.

Performing service configuration may comprise determining a mode of operation, the mode of operation comprising at least one of device type communications mode or cellular access mode.

Device type communications may comprise at least one of instant radio access and device to device communications between a plurality of nodes and user equipments.

Instant radio access may comprise one to many broadcast based device to device communication.

The process may comprise causing a release request to be sent to a node and receiving release confirmation from the node.

The node may be at least one of a node of the network and a node of the associated cellular network.

The service coverage zone operation may include at least one of creating, modifying and releasing a service coverage zone.

The process may comprise at least one of causing a request to be sent from the at least one user equipment and a transmission to be sent from the at least one user equipment, the service coverage zone operation determined in response to the request and transmission, respectively.

Node configuration may comprise at least one of service coverage zone identity, service coverage zone resource allocation and service coverage zone type.

A service may be shared by one or more operators.

In an ninth aspect there is provided a computer program product for a computer, comprising software code portions for performing the steps the method of the first and/or second aspects when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 5b shows a flowchart of an example method for a user equipment operating in a targeted service area;

FIG. 9 shows a schematic diagram of an example apparatus;

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
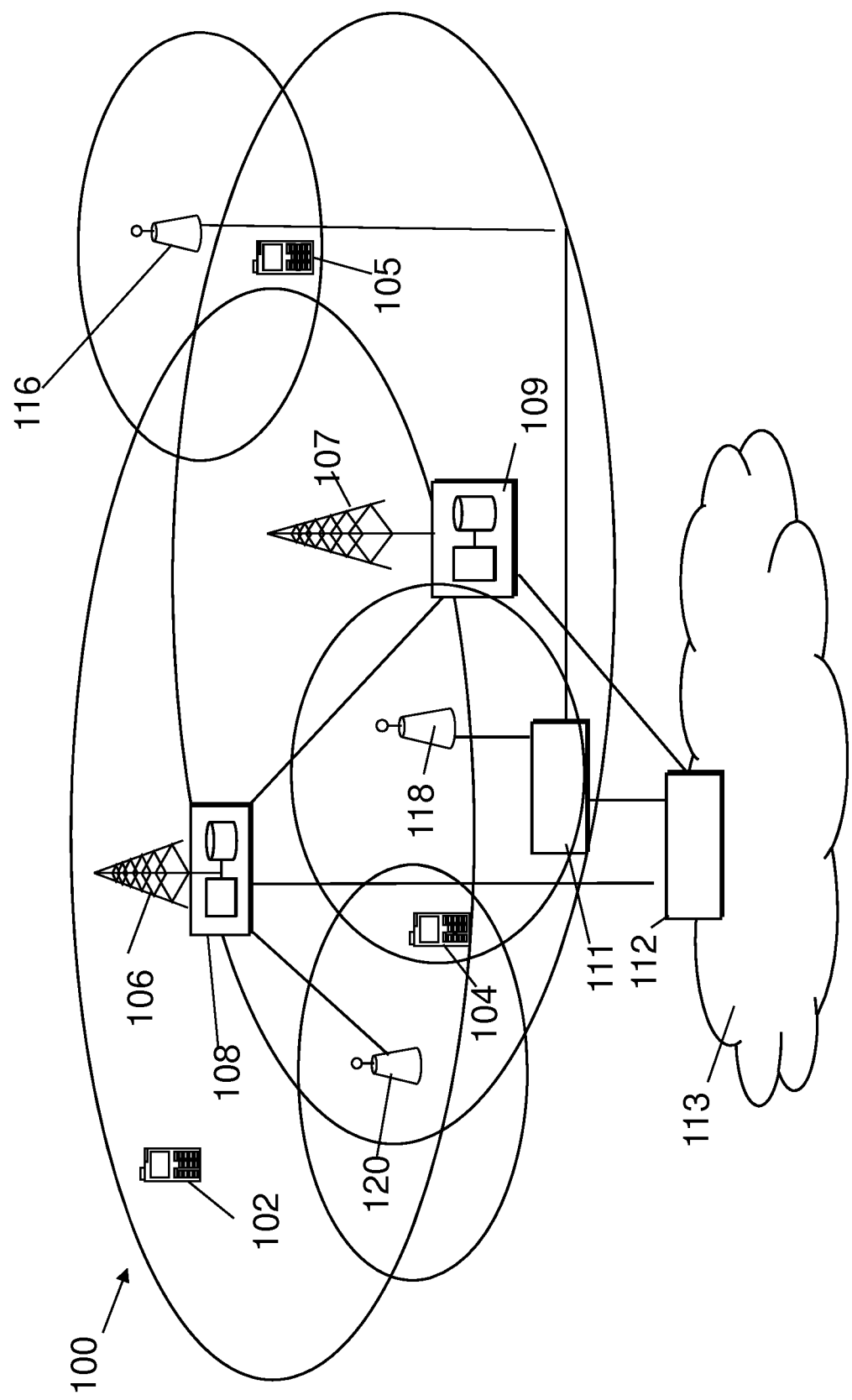
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such as that discussed in relation to FIG. 7.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

The embodiments are not, however, restricted to the system given as an example but a person skilled in the art may apply the solution to other communication systems provided with necessary properties.

Figure 2:
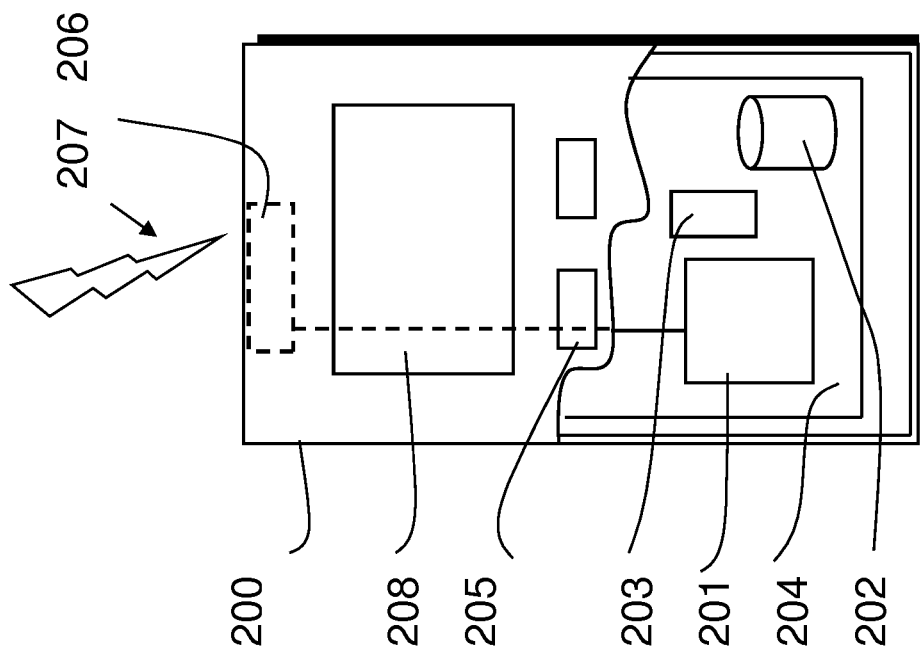
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Another example of a suitable communications system is the 5G concept. Network architecture in 5G may be quite similar to that of the LTE-advanced. Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Providing fast and reliable V2X communications has been identified as a key enabler for 5G. Support of vehicular communication in 5G is expected to enable a range of applications and services with different characteristics and requirements. Applications may include, but are not limited to, safety related applications and full handling or controlling of cars by the vehicles themselves. Facilitating a free flow of data, which may be real-time with different levels or classes of traffic load and traffic priority, is desirable. for vehicular communications between a vehicle and other vehicles and/or other roadside devices within a specified proximity range and communication between an authenticated and authorised vehicle device (including UE) and a serving radio access network.

A method for using current cellular technologies, for example, 3GPP LTE-A Rel'12 ProSe D2D discovery and communications, with certain enhancements proposed for facilitating fast and reliable V2X communications has been suggested. This method is based on adaptive 1:M broadcast based D2D transmissions between vehicle device and vehicle device and between vehicle device and designated roadside unit which is a part of an. instant radio access (instant synchronized D2D based radio access) network coverage layer. In one embodiment, the instant radio access network coverage layer is denoted as i-RAL.

1:M (one to many) broadcast based D2D (Device-to-Device) communications using dedicated or commonly shared spectrum resources, similar to that being specified in 3GPP Rel'12 for ProSe D2D discovery and communications, may allow a capable receiving device to receive D2D communications from a transmitting device in its proximity without need of D2D discovery and connection establishment with the transmitting device beforehand. That is, as long as the receiving device is provided with a valid resource pool to monitor and receive D2D transmissions sent by any transmitting devices within its proximity, the receiving device is able to receive D2D communications transmitted by those transmitting devices. The transmitting devices, on the other hand, may be: (i) allowed to select resources from a preconfigured transmission resource pool to transmit for 1:M broadcast based D2D communications autonomously; or (ii) configured with dedicated resources by a serving radio access network (RAN) for D2D transmissions. There is no control plane needed for the air interface over the D2D link. This kind of 1:M broadcast based D2D communications may provide instant packet access and proximity communications between devices. 1:M broadcast based D2D communications may be applicable for V2V communications.

For V2V communications, 1:M broadcast based D2D communications must be adopted in a fast moving or high mobility environment of vehicles' devices with/without SIM or regardless of operators to ensure fast and reliable V2V communications for, e.g., safety related applications and services in highways scenarios for example.

In one example arrangement, a network deployment arrangement has been proposed, in which Road-Side Units (RSU) which are deployed along the road sides, e.g., mounted on roadside lamps for instance, provide individual local area radio access points for V2X communications (X stands for either Vehicle, denoted as V, or Infrastructure, denoted as I, or pedestrian denoted as P). The RSUs are considered as designated devices which are primarily capable of being involved in direct 1:M based D2D communications of cellular networks with vehicles' relevant devices. The RSUs are deployed and configured to form an instant synchronized D2D based radio access network coverage layer, denoted as i-RAL, for supporting V2V communications over a certain service area of interest (e.g., a certain highway). That is, i-RAL is considered as a synchronized network of a number of designated D2D capable cellular devices which are deployed together as RSUs and configured to act as D2D agents of a serving cellular network in supporting V2V communications over a certain service area of interest. Individual involved vehicles' devices under the coverage of i-RAL may communicate with each other and RSUs of i-RAL instantly, using 1:M broadcast based D2D communications on preconfigured spectrum band with either dedicated or commonly shared resources. The serving network may be, for example an E-UTRAN network or a 50 system with network architecture as discussed above.

Individual RSUs of i-RAL may be configured to transmit certain D2D synchronization signals (D2DSS) synchronously throughout i-RAL with a certain recognizable pattern, e.g. the same D2DSS to be transmitted by all RSUs of the same i-RAL, to provide D2D synchronization references for V2V communications within the iRAL coverage. A specific pattern of D2DSS sequences may be assigned per i-RAL instead of per RSU. Furthermore, RSUs of i-RAL may be configured to broadcast some messages for i-RAL and V2V service discovery purposes. An i-RAL specific synchronization signal may make configuration easier and reduce the time for discovering the synchronization in UEs by limiting the synchronization space.

i-RAL as a whole may be made visible to V devices. The visibility of i-RAL as a whole means that a UE may not see each RSU as an individual unit, but only see the whole service area provided by i-RAL. When UEs are under coverage of i-RAL they may receive a specific indication as discussed below and optional V2V communication related configuration (e.g. transmission mode, resource pool or destination ID etc.) related to data delivering for different kind of applications. The V2V communication related configuration may take into account the specific nature of the different applications. So, when a UE is making a transmission within i-RAL, the transmission is handled in a specific way although the transmitter and receiver have not discovered each other beforehand.

Availability of i-RAL may be indicated to V devices to allow V devices to enable V2V services with i-RAL supports when V devices are moving into the coverage of the i-RAL. The indication may be provided by the serving network via either common or dedicated control signalling, in form of, e.g., i-RAL identity or any discoverable or derivable i-RAL specific feature or information such as i-RAL specific reference signals or related D2D resources. Alternatively, or in addition, the indication of i-RAL may be provided by individual RSUs of the i-RAL, e.g., in the form of i-RAL specific pre-configured D2D synchronization signals as proposed above.

RSUs of i-RAL may be interconnected with each other (and to e.g. the internet) using possible wired or wireless connections as preconfigured, forming a local signalling and data forwarding sub-network of RSUs in order to facilitate simple and effective forwarding between RSUs within the i-RAL. An RSU is considered as a designated multi-user content re-broadcasting agent device involved in direct D2D communications with individual V devices rather than a conventional access point (AP) which provides radio access toward the network or relaying device. However, these RSUs may be integrated into deployed local 5G APs for providing V2I (Vehicle-to-Infrastructure) as well.

Half-duplex operation problem, hidden terminal problem, or contention problem may be encountered in urgent V2V communications. The half-duplex operation problem refers to cases in which involved V devices may transmit their individual urgent messages to each other simultaneously and therefore cannot hear from each other. The hidden terminal problem refers to cases in which, for example, a large lorry running in between 2 cars on the highway is blocking the 2 cars from direct seeing and communicating for urgent safety related application such as warning and assisting in overtaking the lorry by the car from behind. The contention problem refers to cases in which involved V devices may autonomously select the same resources from a preconfigured common resource pool and transmit simultaneously resulting in collision.

Depending on, e.g., types, requirements or characteristics of involved vehicles' devices, user profiles, applications and services, V2V communications may be realized using: either (i) direct mode with direct D2D between V devices based on e.g. the autonomous D2D communications specified in 3GPP Rel'12 ProSe for PS usage; or (ii) i-RAL assisted mode with direct D2D between V devices and RSUs of i-RAL, where i-RAL is acting as a mediating and collective rebroadcasting layer which is not user-specific or (iii) both.

The following are examples of how the modes (i) to (iii) described above may be applied. Mode (iii) may be applied for, e.g., high-reliability emergency messaging or urgent safety related applications and services for both SIM and SIM-less V devices. Mode (ii) may be applied for, e.g., flooding delay-tolerant collective warning messages or collecting sensing or monitoring data along the highways. Mode (i) may be applied for, e.g., announcing or advertising direct discovery or less delay-and-reliability sensitive messages for common road monitoring purposes.

Different resource pools may be configured for modes (i)-(iii) so that RSUs know V devices intend to have either direct or i-RAL assisted V2V communication mode or both based on the resource pool and therefore determine if rebroadcast is needed or not.

The destination ID in D2D communication may be (re) used to indicate which one of (i)-(iii) V devices intend to have for V2V communications of interest, as noted above. For this, different preserved or predefined destination ID or ID group may be configured for mode (i)-(iii). RSUs, based on destination ID in either D2D related L1 control information or D2D PDU, may determine if rebroadcast is needed or not.

The destination ID in D2D communication may be (re) used to indicate what kinds or QoS classes or profile types of V2V communications' devices, user profiles, applications and services intended to have for ongoing V2V communications.

For (ii), QoS driven corresponding coordinated resource pools are provided for transmissions from V devices to i-RAL and then from i-RAL to V devices for certain QoS class of V2V communications, as semi-statically preconfigured or more dynamically configured and controlled by the serving network via, e.g., the serving E-UTRAN (macro eNB and/or integrated APs).

For contention resolution, assuming that transmitting V devices autonomously select resources from a preconfigured resource pool to transmit to RSUs, the transmitting V devices in the mode (ii) upon hearing collective rebroadcast back from RSUs may detect whether their individual messages are lost or collided previously or not and decide if a retransmission is needed.

The transmission modes (i), (ii) and (iii) may be pre-mapped to be used with certain applications and certain devices or the devices are making the mapping dynamically triggered by applications or connected devices. In the actual transmission a UE may select the transmission mode based the mapping. The i-RAL layer may handle the data delivering according the selected transmission modes based on information received in conjunction with the data transmission or the corresponding resource pool. The serving EUTRAN may monitor the resource usage of the transmission modes for control and pre-configuration of i-RAL layer.

The destination ID may be sent in one part in D2D related L1 control information and in another part in the header of L2 MAC PDU. Hence, at least some part of the destination ID addressing space as well as the corresponding signalling fields in L1 or L2 can be utilized for different indicating purposes, such as indicating different treatment profiles, modes, types or classes of V2X communications, especially when common resource pools are applied for many different sorts of V2X communications. The destination ID addressing space may be utilized on L1 level or L2 level or both with a combination of the 2 spaces of ID and L2 ID or a combined space of higher layer ID. A single space on L1 ID or level may be sufficient for V2X communications.

Figure 3:
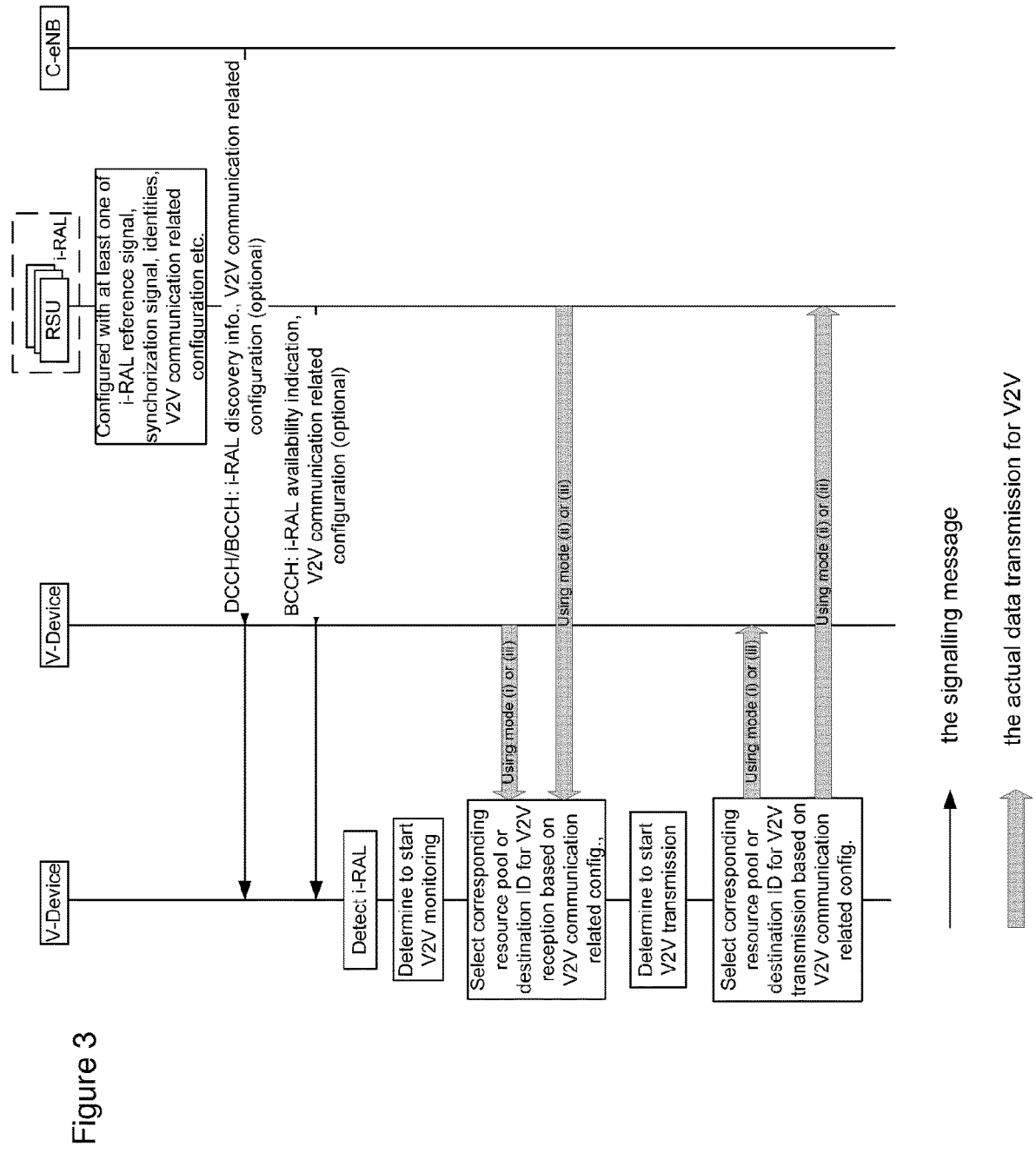
FIG. 3 shows a flowchart of an example method of V2V communication.

FIG. 3 illustrates one example of the procedures for proposed V2V communication facilitated via i-RAL and based on D2D communication. The RSUs may be configured either by e.g. OAM or a controlling serving network entity (e.g. controlling eNB or RSU integrated AP). The i-RAL related configuration may be performed when i-RAL is deployed and/or formed or dynamically. Configuring i-RAL when the i-RAL is deployed and/or formed may be preferable for pre-defined configuration from O&M. Configuring i-RAL dynamically may be more suitable for dynamic configuration from controlling eNB. From V device perspective, i-RAL and V2V communication related configuration may be either pre-configured as discussed below in (i) or configured via controlling eNB as discussed below in (ii). In both case, the RSUs that form the i-RAL need to indicate the availability of i-RAL in order to allow V devices to discover/detect i-RAL and enable corresponding V2V services. In addition, the V2V communication related configuration (e.g. the transmission modes and corresponding resource pool or destination IDs and related mapping configuration on V2V type, requirements or characteristics, user profile, applications and services) may be provided by i-RAL if not pre-configured or provided by controlling eNB. Based on those configurations, V devices can detect the i-RAL and determine the actions (e.g. select the right transmission mode and corresponding resource pool or destination group ID) on V2V communication accordingly.

It has been observed that most of data flows related to road safety and traffic efficiency applications of vehicles' communications are localized or specific to certain roads whereas remote vehicle tracking and monitoring, information or entertainment applications for human consumption aboad may require remote network access. It is further observed that there may be many individual communication devices or machines aboad a vehicle which may be involved in some wireless communications. The possibility of using the same communication platform for all radio access communications from a vehicle may be rather desirable in terms of exploring and exploiting user contexts, diversities, co-operative networking techniques for secure and efficient spectrum and network resource utilization, network performance, quality of service and end-user experience.

i-RAL may, in one example, have 2 modes of resource allocation and operation: (i) autonomous operation based on pre-configurations for i-RAL as well as all relevant individual devices; and (ii) network assisted operation based on coordination and control provided by at least one serving E-UTRAN. Both of the layers may be considered as integrated parts of 5G network.

For the first mode (i), related to providing D2D synchronization references for V2V communications described above, a common synchronization reference or source for i-RAL may be provided by a wired or wireless network connected to i-RAL, as preconfigured.

For the second mode (ii), a mobile cellular radio access layer provided by serving E-UTRAN may be facilitated over i-RAL for relevant devices aboard vehicles including UE, also referred to as V devices. In addition, the serving E-UTRAN may coordinate and control the overall i-RAL including individual RSUs or APs thereof as well as relevant V devices and V2X operations. For examples, the serving E-UTRAN consisting of macro eNB may provide synchronization reference and related common control signalling for i-RAL as well as dedicated control signalling for individual involved devices (on macro cell basis).

For the serving network to support the proposed V2X communications with i-RAL, macro eNB or RSU integrated AP may need to indicate (in system information blocks (SIB) or via dedicated signalling) the support of V2V communications to V devices, including the availability of i-RAL; i-RAL identification and semi-static configuration for i-RAL and service discovery; transmission and/or reception resource pools for V2V communications of interests including direct V2V and i-RAL assisted V2V which may be specific to certain classes of users and services, i.e., depending on types, requirements or characteristics of V2V communications' devices, user profiles, applications and services.

From spectrum use and sharing perspectives, V2V communications should be enabled regardless of home and serving operators' networks. Thus, resource pools on single-frequency spectrum band or carrier dedicated to V2V communications or at least specific application and services thereof may be preferable.

There will be coordination between transmission pools for V devices and RSUs (and corresponding reception pools thereof) in i-RAL assisted V2V communications specific to certain urgent application and service to resolve the half-duplex operation problem or the hidden terminal problem within a specific delay. For examples, corresponding Tx slot or subframe for RSUs are shifted with k slots later than that for V devices resulting in a (k+1) slot delay for i-RAL assisted V2V transmission. This coordination might be explicitly or implicitly indicated to receiving devices so as to decide to monitor and receive V2V communications in an energy efficient fashion, e.g., avoiding duplicating reception or utilizing repetition for combining or reassuring purposes.

The following relates to cellular network integrated aspects, including network deployment arrangements, network access and admission control and the introduction of a service coverage zone, which may be a smart multi-tenancy, multi-service communication zone, denoted as SM-Zone. In the following, it is assumed that, in the network system under consideration, the roadside units (RSU) which are deployed along the road sides, e.g., mounted on roadside lamps for instance, are small access points or base stations enhanced and equipped with D2D capable devices so as to be capable of not only providing small cell coverage to cellular access capable devices but also being involved in direct 1:M broadcast based D2D communications, with relevant devices aboard individual vehicles.

Considering a highway use case scenario for a more specific example, RSUs deployed along the highway may be configured to form a localized radio access layer or, sub-network, of which the i-RAL described with respect to FIG. 3 is one example, which provides instant radio access without dedicated radio connection establishment beforehand for a device using direct 1:M broadcast based D2D communications mode between the device and one or more local RSUs as well as regular cellular access mode with dedicated radio connection established between the device and the selected one of RSUs.

In addition to the localized radio access layer, it is assumed that a macro cellular mobility coverage radio access layer over the highway is provided by some serving cellular network, in one embodiment an LTE-A network, which may coordinate and control at least part of the instant radio access layer, RSUs thereof as well as vehicles' communications modes of operation and resources to be used under the coverage layers. Both of the layers are considered as integrated parts of 5G network.

Figure 4:
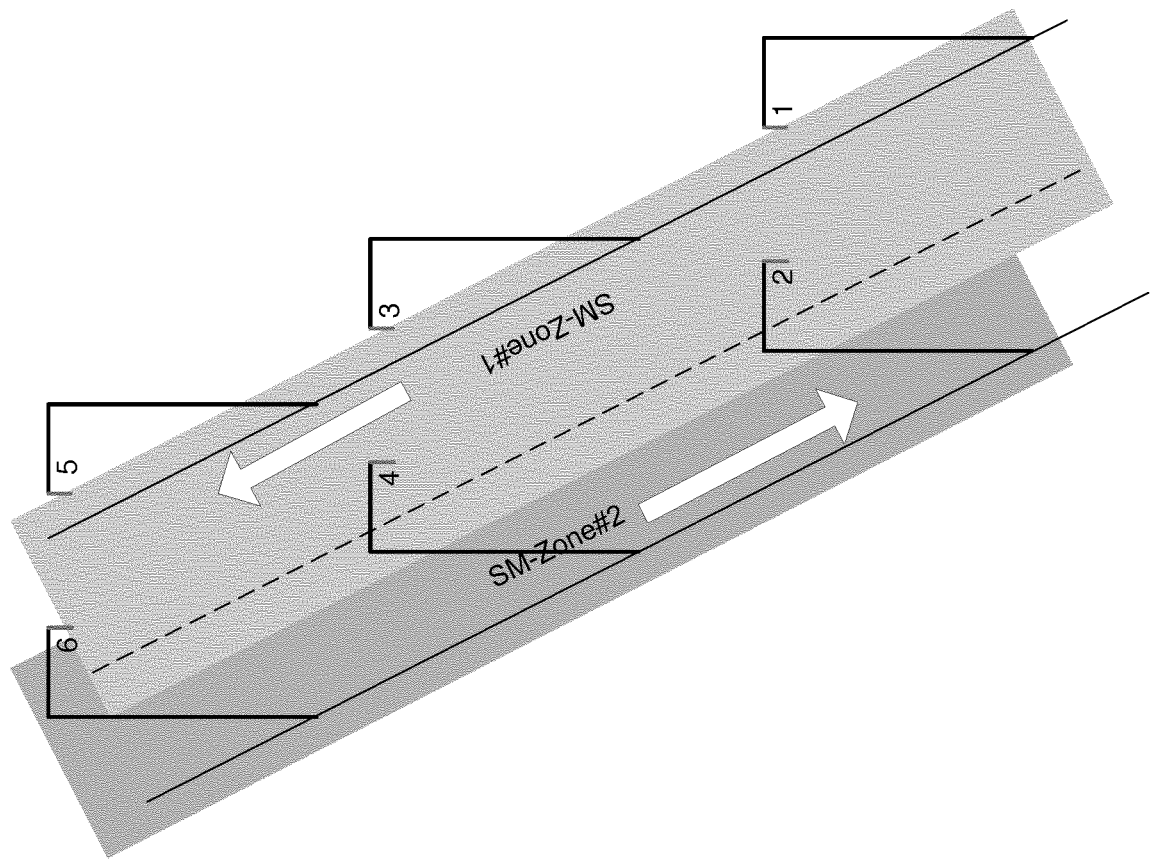
FIG. 4 shows a schematic diagram of two SM-Zones.

FIG. 4 shows a schematic diagram of two service coverage zones, or SM-Zones, provided by RSUs #1 to #6. In a broad conceptual view, an SM-Zone is considered as a flexible service coverage zone within the overall radio access coverage area provided by a subset of the localized radio access layer or sub-network formed by a number of deployed local access nodes (AN) whether interconnected or not under assistance or control of a serving macro mobility layer (e.g., macro E-UTRAN) if available or under control of the local sub-network controller, designated to provide a set of radio-access applications and services for targeted users or groups of users. In the example shown in FIG. 4, a first SM-Zone is provided by RSUs #1, #3 and #5 and a second SM-Zone is provided by RSUs #2, #4, and #6. SM-Zones assume the local access layer formed by RSUs or ANs capable of providing both regular cellular access and instant radio access using 1:M broadcast based D2D communications for vehicles' devices as well as users' devices aboard vehicles, as described above. The use of flexible SM-Zone may allow for efficient support of V2X communications in cellular network environment, adapted to diverse and demanding applications and services of vehicles communications (low-latency, high-mobility, high reliability, multi-service and multi-tenancy) as well as dynamic nature of on-road traffic load distributions and behaviours over time and space (different kinds or different sections of roads, different kind of traffic load distributions and behaviours in different time zones of the day in different weather conditions, seasons, etc.).

The following relates to network deployment arrangements, network access or admission control and resource allocation for an SM-Zone.

Figure 5A:
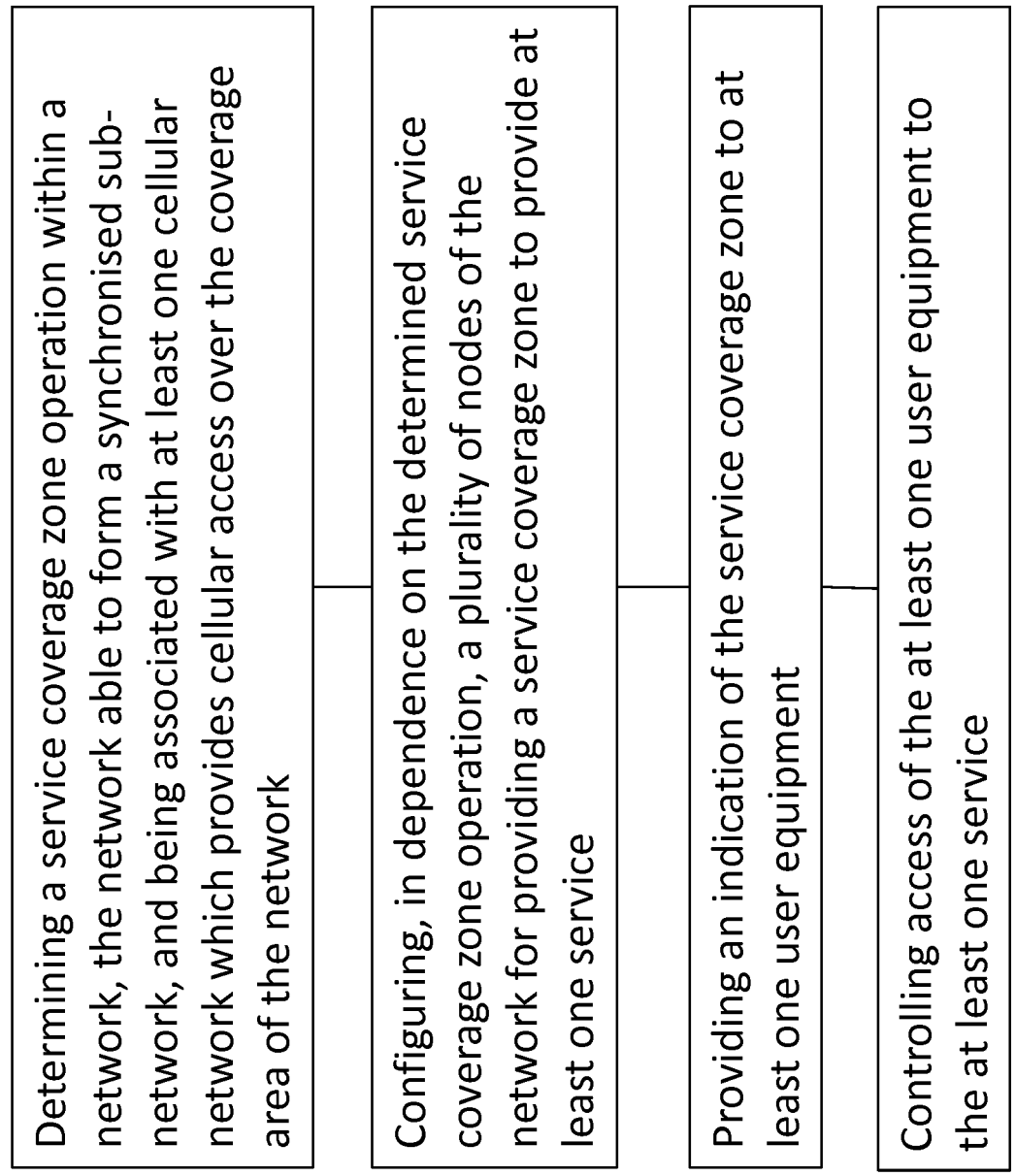
FIG. 5a shows a flowchart of an example method of providing a set of applications and services for targeted users in an SM-Zone.

FIG. 5a shows a flowchart of an example method for providing a set of applications and services for targeted users or groups of users using devices, with or without SIM, over a targeted service area in a cellular network comprising of at least a plural of local access nodes (AN) deployed over the targeted service area forming a synchronized sub-network. The method comprises, in a first step, determining a service coverage zone operation within a network, the network able to form a synchronised sub-network, and being associated with at least one cellular network which provides cellular access over the coverage area of the network, in a second step, configuring, in dependence on the determined service coverage zone operation, a plurality of nodes of the network for providing a service coverage zone to provide at least one service, in a third step, providing an indication of the service coverage zone to at least one user equipment and, in a third step, controlling access of the at least one user equipment to the at least one service.

FIG. 5b shows a flowchart of an example method of a user equipment operating in a targeted service area in a cellular network comprising of at least a plural of local access nodes (AN) deployed over the targeted service area forming a synchronized sub-network. The method comprises, in a first step, receiving an indication of a service coverage zone service within a network, the service coverage zone service provided by a plurality of nodes of the network being configured in dependence on a determined service coverage zone operation, the network comprising a plurality of nodes being able to form a synchronised sub-network, and being associated with at least one cellular network which provides cellular access over the coverage area of the network and requesting access to the service coverage zone service.

The service coverage zone operation may include creating, modifying and/or removing a service coverage zone.

For example, SM-Zone(s) provided by a plurality of nodes of a network, in an embodiment, a selectable set(s) of deployed RSUs, may be semi-statically or dynamically configured (created, modified or removed) over a certain geographical service area of interest, in terms of zone sizes, life-times and resource arrangements (for examples one or multiple overlapping zones with different sizes for different time of the day, largest one for essential safety applications throughout the day for all vehicles, one for public or large transportation vehicles, one for public-safety vehicles, one for on-road information and entertainment services, etc.), depending on nature of roads (highways or freeways, main roads, city centre roads, one direction or two direction roads, car-only or motor-way roads, road sizes, speed limits, etc.) and/or associated transportations' traffic characteristics (load and behaviour pattern) of vehicles and peoples over time (rush hours or not). In one embodiment, selected RSUs such as those RSUs located at the road entry or exits (i.e., cross sections of roads) which may be involved more in handling users upon entering or leaving certain SM-Zones may be further enhanced and configured differently from other RSUs (e.g., using an exclusive sets of physical or logical IDs, radio ranges, full cellular access cell capabilities and services, etc., so that devices may better discover these nodes and therefore initiate designated actions or procedures related to entering and leaving SM-Zones (e.g., SM-Zone discovery and information update, SM-Zone reselection, or even SM-Zone handover). The service coverage zone operation may be performed by an associated cellular, or tending, network or by the network itself, e.g. the local RSU network, as preconfigured and agreed with tending operator.

Determining of the coverage zone operation may be carried out in response to a request of a user equipment, as a response to a detection of a transmission from a user equipment and/or based on a decision to provide the service coverage zone.

The transmission from a user equipment may be direct 1-to-many broadcast based connectionless communication" as specified in 3GPP rel'12 for ProSe/D2D direct communication. No communication connection is required before the transmitting UE starts transmission. From physical layer transmission perspective, the transmission may be broadcast based without any physical layer feedback for e.g. power control. From L2 perspective, there isn't HARQ or ARQ feedback either. The group/multicast communication may be realized in L2 based on L2 target ID which is target group identifier so that only the UEs belonging to target group will deliver the received L2 packets to upper layer.

The decision to provide a service coverage zone may comprise the determining of the service coverage zone operation due to configuration from the associated network side (e.g. OAM) to provide a certain zone over a certain road within a certain time of day without any trigger from the UE side.

The nodes of the network may be configured to provide a user equipment device with at least one of instant radio access and cellular access. The plurality of nodes may provide a user device with either instant radio access without a need of radio connection establishment between the user device and at least one of ANs beforehand or regular cellular access with a radio connection established between the user device and at least one of ANs that is selected serving the user device or both In an embodiment, the cellular network associated with the network may be referred to as a tending cellular network. The subset of plurality of nodes may be configured and controlled by and/or integrated to one or more tending cellular networks which provide cellular coverage over the targeted service area to provide at least the instant radio access designated for a set of targeted applications and services for targeted users or groups of users of individual tending cellular networks over a designated service coverage zone within the targeted service area of the sub-net, wherein a tending cellular network, at any given time during the network operation.

The node configuration may comprise at least one of service coverage zone identity, service coverage zone resource allocation and service coverage zone type. In an embodiment, the network may select and configure a set of deployed RSUs along a certain road or highway or local ANs in a certain local service area to form a service coverage zone, or SM-Zone, to provide a service. The service may comprise a certain set of applications and services for certain user's or groups of users' devices on certain pools of radio resources over the service area of interest.

For example, in regard to adaptive instant-D2D-based-radio-access modes, the network may allocate dedicated transmission resources for individual RSUs inside the SM-Zone for certain applications and services, e.g., urgent safety related ones, in such a way that optimizes spatial reuse of radio resources as well as monitoring overhead (energy efficiency) for vehicles' devices receiving D2D from RSUs. In one embodiment, this resource allocation may be coordinated based on road traffic directions and spatial deployment pattern of RSUs, as RSUs are likely deployed in a regular pattern such as mounted on roadside lamps along the road or highway in one of the deployment scenarios under consideration. For example, if the set of dedicated resources assigned to RSUs is indexed as {1, 2, 3, 4, 5, 6} then according to an embodiment in one direction of the road the spatial resource reuse pattern may be {1, 3, 5} and in the other direction is {2, 4, 6} as illustrated in FIG. 4. This pattern is then indicated or made discoverable to relevant users or user groups, either explicitly or implicitly, as part of configuration information on, .e.g., identifications of the SM-Zone, corresponding RSUs or D2D reception resource pools. Using this information, relevant devices may determine which resources to be monitored in the first place.

The SM-Zone may be configured as "implicitly" or "explicitly" visible to targeted user devices and/or may be adapted to tending operator's needs and desires (provided service areas, services, operational restrictions and rules), targeted applications and services, users or user groups, device types, status and conditions of traffic load, resource utilization, user mobility, radio environment, location, timelines, and so forth.

The implicit SM-Zone implies tight integration and control from the serving macro layer and may be specific to the serving macro cell, as related synchronization, resource allocation and configuration of same SM-Zone may vary from cell to cell.

Different kinds of SM-Zones with different profile characteristics may be introduced and utilized to provide advanced adaptive operation for vehicles' communications. For example, general-purpose or dedicated-purpose SM-Zones may be introduced. General-purpose SM-Zones may be commonly configured for all capable devices including SIM-less ones operating for essential safety applications. Dedicated-purpose SM-Zones may be configured for certain targeted users or user groups for further applications and services which may require full authentication and authorization as well as admission control.

The serving macro eNB may support one or more SM-Zones of different kinds and may indicate at least what kinds of SM-Zones are in service in order to allow targeted class or group of user devices to activate corresponding SM-Zone specific operation mode(s) upon hearing the indication of SM-Zone type from RSUs or ANs forming the SM-Zones. The configuration information needed to operate SM-Zone specific operation mode(s) corresponding to the indicated SM-Zone(s) may be provided beforehand with either pre-configuration (e.g. for general purpose SM-Zones) or on-the-site signalling, e.g., via broadcast system information or dedicated signalling (e.g. for dedicated-purpose SM-Zones) by the serving macro eNB, or both.

The explicit SM-Zone may allow for the localized radio access layer physically provided by a local network of deployed RSUs or ANs. The localised radio access layer may operate on its own (including synchronization source, spectrum band and radio technology) to be a multi-service multi-tenancy local network which can be utilized as an add-on access layer to different operators' networks across multiple macro cells (umbrella macro layers) to support e.g. vehicles' communications of interest.

SM-Zone is adopted herein as a means of utilizing and optimizing the localized radio access layer for individual tending cellular networks in supporting demanding and diverse applications and services of vehicles' communications. That is, making SM-Zone physically and logically visible to users, at least to some certain extents, may allow for flexible and advanced configuration, control and operation of individual SM-Zone.

In one embodiment, an individual SM-Zone may be assigned with a unique identity by individual serving macro network. Providing an indication of the service coverage zone may comprise providing the SM-Zone identity to at least one UE. An indication of the service coverage zone may be provided by a node of the associated network or one of the plurality of nodes of the subnetwork. For example, the SM-Zone identity may be advertised to users by all relevant macro eNBs as well as selected RSUs or ANs involved in forming and operating the individual SM-Zone. The unique identity of SM-Zone may comprises of at least a SM-Zone ID and some information related to profile characteristics of the individual SM-Zone, including, e.g., associated serving operator's information, predefined kind or class, configuration information as mentioned above in the former option, and so forth, which in part may be provided as semi-static pre-configurations to users and in part indicated on the site.

In one option, SM-Zone ID specific to a serving or tending network may be addressed so that associated serving operator's information may be derived and there is no need to include e.g. explicit PLMN ID in the SM-Zone's identity information. In another option, addressing space of SM-Zone IDs may be shared among different tending operators and the shared local network (one of selected RSU, or AN, or the local network's OAM server) may help in resolving any possible addressing conflict. For example, upon configuring a new SM-Zone, the local network may suggest some unused SM-Zone ID(s) to the tending network to select for the service area of interest. This option allows using sufficiently small addressing space and therefore reducing signalling overhead of indicating SM-Zone identity. This option also allows for configuring common SM-Zone(s) across different tending operators. This embodiment hence implies that individual RSU or AN may be involved in serving many individual SM-Zones of different operators' some of which may be common to different operators' as preconfigured or share the same profile characteristics and operation modes and therefore commonly served across different operators'. In this regard, one option of indicating or advertising individual SM-Zones to users from macro eNBs and RSUs or ANs is that all configured SM-Zones may be sorted and advertised by their types first, as in the option of implicit SM-Zone above, and then under each indicated type SM-Zone ID and related semi-static configuration information of individual SM-Zones configured with the same type are then included. The configured SM-Zone indicated without association to any particular tending operator can be considered as applicable or shared by all operators.

In an embodiment, controlling access of at least one UE to at least one service provide by a service overage zone may comprise a network providing SM-Zone based control for targeted users or user groups to access the individual configured SM-Zone and use specified communication modes thereof, adapted to tending operator's needs and desires (provided service areas, services, operational restrictions and rules) as well as targeted applications and services, users or user groups, device types, status and conditions of traffic load, resource utilization, user mobility, radio environment, timelines, and so forth.

Controlling access to the at least one service may comprise receiving a service request associated with the at least one service form a UE. Controlling access may comprise performing, in response to the service request, a service configuration for the at least one user device and providing service configuration information to the at least one user equipment.

In an embodiment the network, for example a serving macro eNB, and, optionally, selected RSU or AN may be configured to indicate to targeted users and user groups tending operator network service configuration information. Service configuration may comprise authentication, authorisation, admission control and resource allocation for the UE making the request.

In an embodiment, the serving network provides SM-Zone specific admission control, necessary configuration and resource allocation for individual devices for certain requested applications and services. Service configuration information may comprise e.g., specific configurations, triggering conditions and/or rules for accessing and using specified communication modes provided in the individual configured SM-Zone (including, amongst others, related barring information, need of authentication and authorization or admission control, synchronization offset between the localized radio access network physically providing the SM-Zone and the serving macro cell, resource allocation, applications and services). Regular cellular access to RSUs may be applied for targeted users or user groups for certain applications and services in the adaptive fashion configured and controlled as part of the SM-Zone. For instance, where or when macro coverage is not available (inside a tunnel configured as a part of existing SM-Zone or a separate SM-Zone), individual RSUs may provide regular cellular access services as part of certain configured SM-Zone(s) and/or independently for regular UE devices at least. In this regard, certain SM-Zone(s) configured for local vehicles' communications and not remote network access services may provide only instant D2D based radio access and not cellular access or cellular access with lower priority.

User equipment information associated with the service configuration may be provided to nodes of the network.

Availability of an instant radio access network may be indicated to the at least one user equipment using control signalling.

Based on knowledge of available SM-Zones and certain configurations thereof as indicated or preconfigured by individual tending network, individual relevant or targeted device may determine to be an active user of one or more SM-Zones in need and therefore may, based on SM-Zone configuration (e.g. whether authentication or authorization is needed or not), initiate necessary SM-Zone specific service request indicating identity of selected SM-Zone(s) to the corresponding serving network, either via the serving macro eNB or RSU. The latter option requesting via RSU may optionally require the device to indicate its serving network so that the local multi-tenancy network of RSUs may forward the request to the right serving network for necessary authentication, authorization and admission control.

Figure 6:
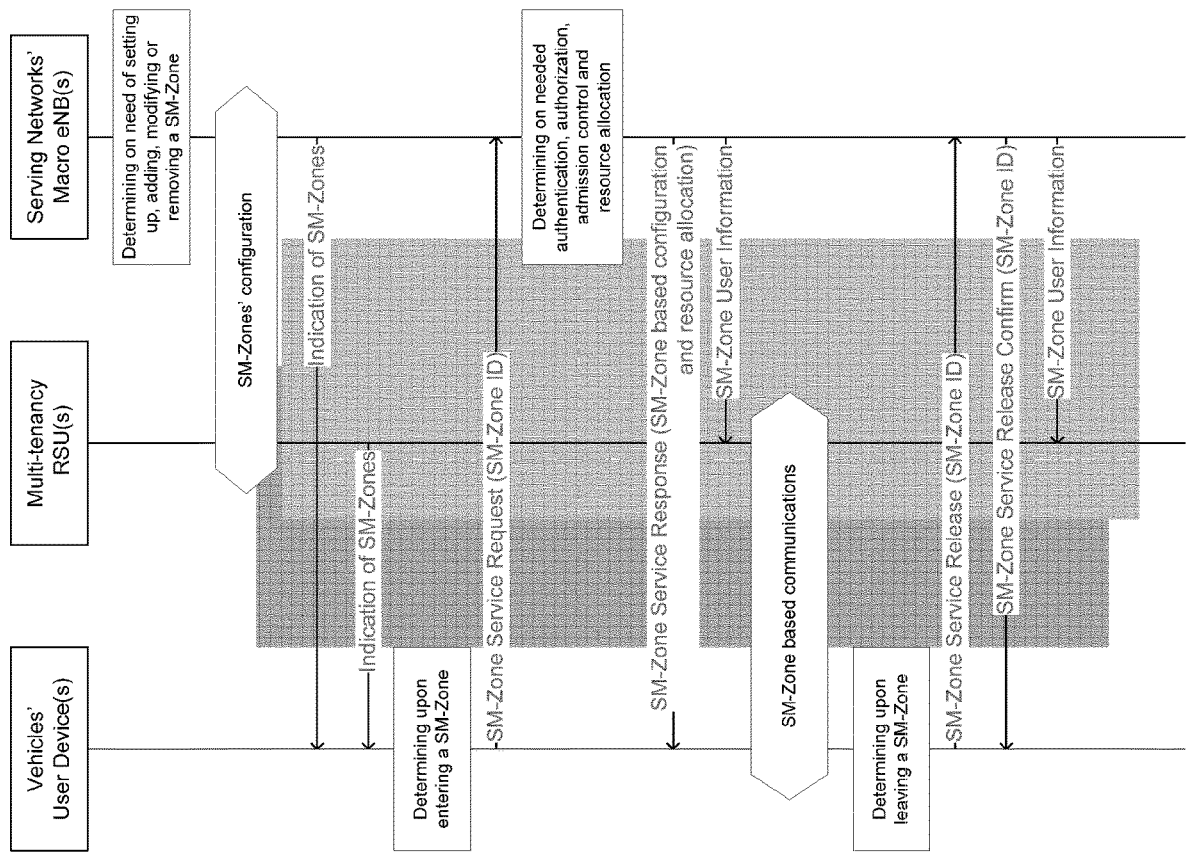
FIG. 6 shows a flowchart of an example method of SM-Zone based network control and configuration for a device.

FIG. 6 shows an example of SM-Zone based network control and configuration for a given device in an embodiment. In this example, the serving networks' Macro eNBS determine a service coverage zone operation, creating, modifying or removing an SM-Zone and configures multi-tenancy RSUs to provide the service coverage zone to provide at least one service. An indication of the service coverage zone is provided to at least one vehicle's user device. The indication may be provided from the cellular network, serving network's macro eNB, or a node of the sub-network, multi-tenancy RSU. A service request associated with the at least one service provided by a service coverage zone is made by the UE. The service request may include service coverage zone information, e.g. SM-Zone identity. The serving network then performs, in response to the service request, a service configuration for the at least one user device and provides service configuration information to the at least one user equipment. Service configuration information may be provided to the plurality of nodes. In the example shown in FIG. 6, the user device initiates SM-Zone Service Request or Release with the serving macro eNB. In an alternative, the user device may initiate SM-Zone Service Request or Release upon entering or leaving the SM-Zone of interest with local RSU or AN and the local RSU or AN will then further the request/release toward the right serving macro serving network of the user device.

Figure 7:
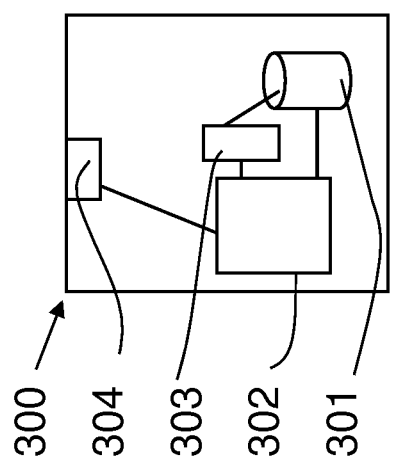
FIG. 7 shows an example of a control apparatus, according to an embodiment.

Embodiments described above by means of FIGS. 1 to 6 may be implemented on an apparatus, such as a node, host or server, or in a unit, module, etc. providing control functions as shown in FIG. 7 or on a mobile device (or in a unit, module etc. in the mobile device) such as that of FIG.

2. FIG. 7 shows an example of such an apparatus. In some embodiments, a base station comprises a separate unit or module for carrying out control functions. In other embodiments, the control functions may be provided by another network element such as a radio network controller or a spectrum controller. The apparatus 300 may be arranged to provide control on communications in the service area of the system. The apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the apparatus 300 may be configured to execute an appropriate software code to provide the control functions. Control functions may include at least determining a service coverage zone operation within a network, the network able to form a synchronised sub-network, and being associated with at least one cellular network which provides cellular access over the coverage area of the network, configuring, in dependence on the determined service coverage zone operation, a plurality of nodes of the network for providing a service coverage zone to provide at least one service, providing an indication of the service coverage zone to at least one user equipment and controlling access of the at least one user equipment to the at least one service.

Alternatively or in addition control functions may include receiving an indication of at least one service coverage zone within a network, the service coverage zone providing at least one service, and provided by a plurality of nodes of the network configured in dependence on a determined service coverage zone operation, the network being able to form a synchronised sub-network, and being associated with at least one cellular network which provides cellular access over the coverage area of the network and requesting access to the at least one service.

Figure 8:
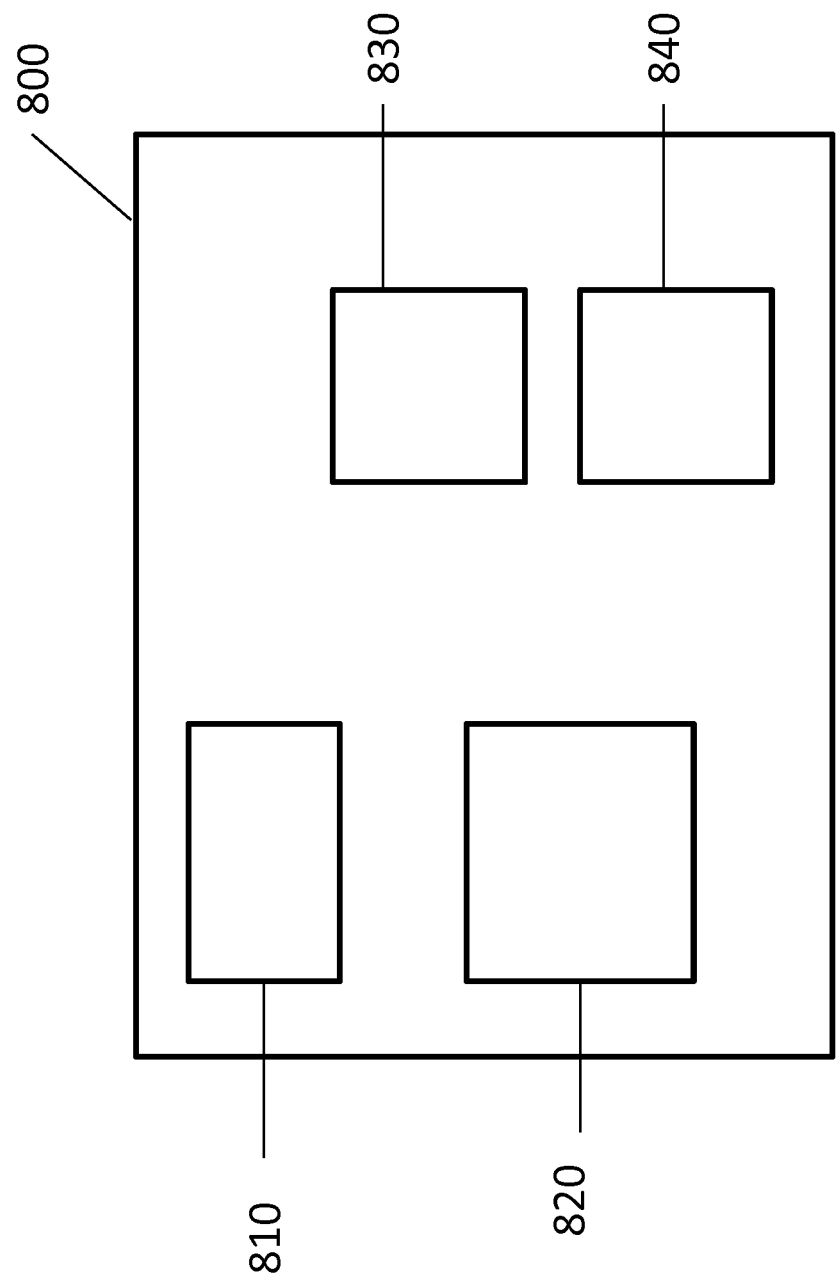
FIG. 8 shows a schematic diagram of an example apparatus.

An example of an apparatus 800, as shown in FIG. 8 may comprise means 810 for determining a service coverage zone operation within a network, the network able to form a synchronised sub-network, and being associated with at least one cellular network which provides cellular access over the coverage area of the network, means 820 for configuring, in dependence on the determined service coverage zone operation, a plurality of nodes of the network for providing a service coverage zone to provide at least one service, means 830 for providing an indication of the service coverage zone to at least one user equipment and means 840 for controlling access of the at least one user equipment to the at least one service.

An example of an apparatus 900 as shown in FIG. 9 may comprise means 910 for receiving an indication of at least one service coverage zone within a network, the service coverage zone providing at least one service, and provided by a plurality of nodes of the network configured in dependence on a determined service coverage zone operation, the network being able to form a synchronised sub-network, being associated with at least one cellular network which provides cellular access over the coverage area of the network and means 920 for requesting access to the at least one service.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G, similar principles can be applied to any other communication system or radio access technology. Embodiments are generally applicable where V2X communication is supported. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 6 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to FIGS. 1 to 6 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   determining, by a serving cellular network, a service coverage zone operation configured to one of create or modify a vehicle-to-x communication-based service within a network formed by a plurality of road side units as instant radio access network coverage layer units, the network of the plurality of road side units:
      providing a plurality of access points between the serving cellular network and device-to-device capable cellular devices, and
      forming a synchronized sub-network of device-to-device capable cellular devices over a coverage area of the network of the plurality of road side units;
   configuring, by the serving cellular network, in dependence on the determined service coverage zone operation, at least a part of the plurality of road side units to provide a service coverage zone, within the coverage area of the network of the plurality of road side units, as the synchronized sub-network for the vehicle-to-x communication-based service;
   providing, by the serving cellular network, an indication of the service coverage zone to at least one vehicle device of the device-to-device capable cellular devices; and
   controlling, by the serving cellular network, access of the at least one vehicle device to the vehicle-to-x communication-based service while the at least one vehicle device is operating in the service coverage zone.

2. The method according to claim 1, wherein the controlling access to the vehicle-to-x communication-based service comprises:
   receiving a service request associated with the vehicle-to-x communication-based service from the at least one vehicle device;
   performing, in response to the service request, a service configuration for the at least one vehicle device; and
   providing service configuration information to the at least one vehicle device.

3. The method according to claim 1, further comprising:
   receiving a release request from the at least one vehicle device;
   providing release confirmation to the at least one vehicle device; and
   providing release information to the at least a part of the plurality of road side units.

4. The method according to claim 1, wherein the determined service coverage zone operation includes at least one of: creating, modifying and releasing the service coverage zone.

5. The method according to claim 1, wherein the determining of the service coverage zone operation is carried out in response to at least one of: a receiving of the service or a release request, detection of a transmission from the at least one vehicle device and a decision to provide the vehicle-to-x communication-based service.

6. The method according to claim 1, wherein the configuring comprises determining at least one of: service coverage zone identity, service coverage zone resource allocation and service coverage zone type.

7. The method according to claim 1, further comprising:
   providing at least one vehicle device information to the at least a part of the plurality of the plurality of road side units.

8. An apparatus comprising:
   at least one processor; and
   at least one memory including computer program code;
   the at least one memory and the computer program code configured to, with the at least one processor, cause the apparatus to:
   determine a service coverage zone operation configured to one of create or modify a vehicle-to-x communication-based service within a network formed by a plurality of road side units as instant radio access network coverage layer units, the network of the plurality of road side units:
      provide a plurality of access points between a serving cellular network and device-to-device capable cellular devices, and
      form a synchronized sub-network of device-to-device capable cellular devices over a coverage area of the network of the plurality of road side units;
   configuring in dependence on the determined service coverage zone operation, at least a part of the plurality of road side units to provide a service coverage zone, within the coverage area of the network of the plurality of road side units, as the synchronized sub-network for the vehicle-to-x communication-based service;
   provide an indication of the service coverage zone to at least one vehicle device of the device-to-device capable cellular devices; and
   control access of the at least one vehicle device to the vehicle-to-x communication-based service while the at least one vehicle device is operating in the service coverage zone.

9. The apparatus of claim 8, wherein the apparatus is a node in a serving cellular network.

10. The apparatus of claim 8, wherein the controlling access to the vehicle-to-x communication-based service comprises:
    receiving a service request associated with the vehicle-to-x communication-based service from the at least one vehicle device;
    performing, in response to the service request, a service configuration for the at least one vehicle device; and
    providing service configuration information to the at least one vehicle device.

11. The apparatus of claim 8, wherein the apparatus is further caused to:
    receive a release request from the at least one vehicle device;
    provide release confirmation to the at least one vehicle device; and providing release information to the at least a part of the plurality of road side units.

12. The apparatus of claim 8, wherein the determined service coverage zone operation includes at least one of: creating, modifying and releasing the service coverage zone.

13. The apparatus of claim 8, wherein the determining of the service coverage zone operation is carried out in response to at least one of: a receiving of the service or a release request, detection of a transmission from the at least one vehicle device and a decision to provide the vehicle-to-x communication-based service.

14. The apparatus of claim 8, wherein the configuring comprises determining at least one of: service coverage zone identity, service coverage zone resource allocation and service coverage zone type.

15. The apparatus of claim 8, wherein the apparatus is further caused to:
provide at least one vehicle device information to the at least a part of the plurality of the plurality of road side units.

16. A non-transitory computer-readable storage medium comprising instructions stored thereon that, when executed by at least one processor, are configured to cause a computing system to:
determine a service coverage zone operation configured to one of create or modify a vehicle-to-x communication-based service within a network formed by a plurality of road side units as instant radio access network coverage layer units, the network of the plurality of road side units:
provide a plurality of access points between a serving cellular network and device-to-device capable cellular devices, and
form a synchronized sub-network of device-to-device capable cellular devices over a coverage area of the network of the plurality of road side units;
configuring in dependence on the determined service coverage zone operation, at least a part of the plurality of road side units to provide a service coverage zone, within the coverage area of the network of the plurality of road side units, as the synchronized sub-network for the vehicle-to-x communication-based service;
provide an indication of the service coverage zone to at least one vehicle device of the device-to-device capable cellular devices; and
control access of the at least one vehicle device to the vehicle-to-x communication-based service while the at least one vehicle device is operating in the service coverage zone.

17. The non-transitory computer-readable storage medium of claim 16, wherein the controlling access to the vehicle-to-x communication-based service comprises:
receiving a service request associated with the vehicle-to-x communication-based service from the at least one vehicle device;
performing, in response to the service request, a service configuration for the at least one vehicle device; and
providing service configuration information to the at least one vehicle device.

18. The non-transitory computer-readable storage medium of claim 16, wherein the computing system is further caused to:
receive a release request from the at least one vehicle device;
provide release confirmation to the at least one vehicle device; and
providing release information to the at least a part of the plurality of road side units.

19. The non-transitory computer-readable storage medium of claim 16, wherein the determined service coverage zone operation includes at least one of: creating, modifying and releasing the service coverage zone.

20. The non-transitory computer-readable storage medium of claim 16, wherein the determining of the service coverage zone operation is carried out in response to at least one of:
a receiving of the service or a release request, detection of a transmission from the at least one vehicle device and a decision to provide the vehicle-to-x communication-based service.

21. The non-transitory computer-readable storage medium of claim 16, wherein the configuring comprises determining at least one of: service coverage zone identity, service coverage zone resource allocation and service coverage zone type.

22. The non-transitory computer-readable storage medium of claim 16, wherein the computing system is further caused to:
provide at least one vehicle device information to the at least a part of the plurality of the plurality of road side units.

* * * * *